(12) United States Patent
Bracewell et al.

(10) Patent No.: US 7,065,568 B2
(45) Date of Patent: Jun. 20, 2006

(54) SYSTEM AND METHOD FOR MANAGING STATES AND USER CONTEXT OVER STATELESS PROTOCOLS

(75) Inventors: Shawn Bracewell, Duvall, WA (US); Ward Beattie, Seattle, WA (US); Russell Simpson, Kirkland, WA (US); Puhazholi Vetrivel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 09/727,191

(22) Filed: Nov. 30, 2000

(65) Prior Publication Data

US 2002/0065875 A1 May 30, 2002

(51) Int. Cl.
*G06F 15/173* (2006.01)
(52) U.S. Cl. .................... 709/223; 709/203; 709/217; 709/224
(58) Field of Classification Search ............... 709/203, 709/217–219, 223–226; 719/300
See application file for complete search history.

(56) References Cited

U.S. PATENT DOCUMENTS

| | | | | |
|---|---|---|---|---|
| 5,689,696 A * | 11/1997 | Gibbons et al. | ................ | 707/1 |
| 5,787,470 A * | 7/1998 | DeSimone et al. | ......... | 711/124 |
| 6,076,108 A * | 6/2000 | Courts et al. | ............ | 709/227 |
| 6,182,133 B1 * | 1/2001 | Horvitz | ...................... | 709/223 |
| 6,310,630 B1 * | 10/2001 | Kulkarni et al. | ............ | 345/776 |
| 6,453,342 B1 * | 9/2002 | Himmel et al. | ............. | 709/213 |
| 6,510,458 B1 * | 1/2003 | Berstis et al. | ................ | 709/219 |
| 6,647,421 B1 * | 11/2003 | Logue et al. | ............... | 709/226 |
| 6,710,786 B1 * | 3/2004 | Jacobs et al. | ............... | 715/744 |
| 6,799,209 B1 * | 9/2004 | Hayton | ....................... | 709/223 |

OTHER PUBLICATIONS

Hadjiefthymiades, S., et al.; *"State Management in WWW Database Applications"*, Proceedings. The Twenty-Second Annual International Computer Software and Applications Conference. 1998, p. 442-448.
Cate, V.; *"Alex-a Global File System,"*, Proceedings of the USENIX File Systems Workshop, 1992, p. 1-11.
Iyengar, A.; *"Dynamic Argument Embedding: Preserving State on the World Wide Web"*, IEEE Internet Computing, vol. 1, No. 2, p. 50-56.
"Principled Design of the Modern Web Architecture"; Roy T. Fielding, et al.; Information and Computer Science, University of California; pp. 407-416.

(Continued)

*Primary Examiner*—Ario Etienne
*Assistant Examiner*—LaShonda Jacobs
(74) *Attorney, Agent, or Firm*—Amin & Turocy, LLP

(57) ABSTRACT

A system and method for facilitating remote access of an application available via a stateless protocol is provided. Such applications are typically accessed via the World Wide Web portion of the Internet (the "Web") using a browser application and an HTTP protocol. The system can include one or more components for caching data associated with the remote access, the data comprising state and/or user specific information. The state and/or user specific information can be stored in a user context object (UCO). One or more user context objects can be managed by a user context manager that facilitates locating user context objects and reclaiming memory associated with user context objects that are no longer necessary to support remote access of the application accessed via a stateless protocol.

34 Claims, 10 Drawing Sheets

OTHER PUBLICATIONS

Alexandrov AD (REPRINT), et al.; "*Ufo: A Personal Global File System Based on User-Level Extensions to the Operating System*", *ACM Transactions on Computer Systems*, vol. 16, No. 3, 1998, p. 207-233.

* cited by examiner

SYSTEM AND METHOD FOR MANAGING STATES AND USER CONTEXT OVER STATELESS PROTOCOLS

TECHNICAL FIELD

The present invention relates generally to computer programming and more particularly to a system and method for managing states and user context information over stateless protocols.

BACKGROUND OF THE INVENTION

As applications accessed via stateless protocols have become more sophisticated, and as the environments with which such applications interact have become more complex, it has become important to provide sophisticated support for applications accessed over stateless protocols (e.g. HyperText Transfer Protocol "HTTP"). For example, for an application available over the World Wide Web portion of the Internet (the "Web"), where the communications between browser and application are achieved via a stateless protocol, it may become important to track information including, but not limited to, who is accessing the application, services desired from the application, recent interactions with the application and likely future interactions. In particular, support can be important to activities including, but not limited to, developing, debugging, managing and/or diagnosing applications available over the Web. Further, support for applications accessed via a stateless protocol can include efficiently locating session resources associated with such applications. For example, support in the form of tracking the number and type of resources allocated to an email session associated with an email application can be important to provide satisfactory response times to application users who are using the email service available via the Web and a stateless protocol to read email.

Conventionally, supporting applications, sessions associated with applications and resources associated with applications and/or sessions accessed via stateless protocols by, for example, tracking state and/or user information, has been difficult to achieve. Even if possible to provide such support it negatively impacted the functioning of such applications and/or was limited in its capabilities. For example, creating artificial URLs that contain both a "real" URL and an "extension" that carries management and tracking information requires transmitting extra information in the URL not related to the URL, which requires additional transmission time, additional processing and which can confuse users who see lengthy and changing URLs. Transporting state information from the application and/or session back to a remote user generates unnecessary network traffic. Further, transporting state and/or user information via expanding URLs does not facilitate supporting operations in an application accessed via a stateless protocol that require multiple interactions with a remote accessor, for example, copying messages from one folder in a remote email application to a different folder. Thus, resource management may not have been performed and the capability of an application available over the Web may have been limited.

Conventionally, some management and tracking of applications may have been attempted through the use of "cookies" (persistent client side HTTP files). It is to be appreciated by one skilled in the art that cookies may, in addition and/or alternatively to being stored persistently in client side files, be allocated per session and/or stored in memory. Although cookies can help maintain some information, cookies cannot be relied upon to support applications accessed via stateless protocols, sessions associated with the applications, and resources associated with such applications and sessions, since users may reject cookies (e.g. for security and/or privacy reasons), and/or browsers, employed by remote accessors may not support cookies. Thus, any support available via cookies may be limited to the application level, not to the session level, which limits the functionality of applications accessed via stateless protocols.

Tracking and/or supporting applications, sessions and/or resources via cookies is further limited because such cookie support may not enable transporting various data types, including, but not limited to binary data, that are employed by applications, sessions and/or resources. Thus, converting between data formats when using conventional support techniques is required. Such conversion consumes processing power and time, and thus negatively impacts applications supported in such a manner.

Thus, there remains a need for a system and method to track and support applications, sessions associated with such applications, and resources associated with such applications and sessions, over stateless protocols, like HTTP.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for tracking, and/or supporting, applications available via stateless protocols, sessions associated with such applications and resources associated with such applications and sessions. More particularly, the present invention relates to managing states and user context information over stateless protocols (e.g. HTTP).

An example aspect of the present invention provides a system to facilitate remote access of an application available via a stateless protocol. The system can include a component for caching data associated with the remote access. The cached data may include both state and/or user specific information. Thus, a state may be maintained for an application and/or session accessed via a stateless protocol. For example, a user may remotely access an email application (e.g., Microsoft Exchange Server) over the Web via HTTP. The system may cache information including, but not limited to, a record of views available to the user, a record of views last employed by the user, a list of recently accessed folders, URLs for commonly used folders, and email addresses of the user. Such information can be cached by a user context manager in a user context object. A user context object can be created for each session associated with an application, thus facilitating maintaining the state and/or user specific information. Such information can facilitate for example, locating resources associated with an application at the session level, thereby mitigating problems with conventional systems.

To facilitate locating a user context object associated with an application and/or session, a globally unique identifier can be generated for the user context object. Used in conjunction with a locale identifier (generated by a browser, for example), a security identifier (generated by an operating system, for example) and a mailbox identifier (generated by an email application, for example), the globally unique identifier can be employed to retrieve a user context object. The globally unique identifier can be transported over a stateless protocol (e.g. HTTP) in space conventionally employed by cookies (e.g. cookie header portion of HTTP request/response).

Applications available over stateless protocols (e.g. HTTP) are frequently accessed by a remote accessor using a Web browser. A locale identifier (LCID) can be generated by the browser, based on a standard HTTP Accept-Language header. An LCID can relate to information including, but not limited to, the language associated with the browser, date and time formats, and a character set, for example. Applications available via stateless protocols frequently run on one or more servers under the control of an operating system. Thus, a security identifier (SID) can be generated by the operating system, for example Microsoft® Windows® NT®. The SID can be generated by processing a (username, password) combination, for example. An example application available via a stateless protocol is an email application. A user of the remote email application (e.g. Microsoft Exchange) can be assigned a mailbox and an alias for that mailbox. Thus, a mailbox identifier (MID) can be generated by processing a (username, domain name, alias) combination.

When a user initiates one or more sessions of a browser application to access an application available via a stateless protocol, a user context object can be created to store information concerning resources allocated to the one or more sessions and to facilitate tracking state and/or user information associated with the remote accessor. A globally unique identifier (GUID) associated with the user context object can be generated by a user context manager to facilitate locating the user context object. As noted above, the GUID can be transported between the browser and the application by stateless protocol requests and responses in space conventionally employed to manage cookies. Thus, in subsequent browser requests associated with the session, the GUID can be sent from the browser session to the application, and in subsequent application responses the GUID can be returned to the browser. With the GUID available in requests, and an LCID, SID and MID available to the application, a user context object associated with a session can be located by examining the LCID, the SID, the MID and the GUID. Since the user context object can store state and/or context information, conventional application and/or session level support problems associated with applications that are accessed via a stateless protocol are thus mitigated.

Another aspect of the present invention provides for memory management of user context objects. A user context manager creates one or more user context objects when a user accesses a remote application. The user context manager can also monitor the usage of the user context objects. In one exemplary aspect of the present invention, if the user context manager determines that an amount of time exceeding a pre-determined threshold has passed without the user context object being accessed (e.g. one hour), then the user context manager can reclaim the memory allocated to the user context object.

Another aspect of the present invention provides for adapting the number, and/or type, of resources allocated to track and/or manage an application available over a stateless protocol. One or more monitoring and feedback components can track the usage of the user context objects. If the usage of the user context objects exceeds a first predetermined threshold, then more resources may be allocated to the user context objects. Similarly, if the usage of the user context objects does not reach a second pre-determined threshold, then some resources may be reclaimed from the user context objects. Further, the monitoring and feedback components can determine whether finite resources should be balanced as the load shifts between one or more applications accessible via the stateless protocol.

In accordance with an aspect of the present invention, a system to facilitate a remote user accessing an application across a stateless protocol is provided, the system comprising: a component for caching data associated with the remote user access, the data comprising state and/or user specific information.

Another aspect of the present invention provides a system to facilitate a remote user accessing an application across a stateless protocol comprising: a component for caching data associated with the remote user access, the data comprising state and/or user specific information, and a component for managing memory storing the state and/or user specific information.

Yet another aspect of the present invention provides a system to facilitate a remote user accessing an application across a stateless protocol comprising: a component for caching data associated with the remote user access, the data comprising state and/or user specific information, and a component for managing memory storing the state and/or user specific information, wherein the memory managing component reclaims resources allocated to a user context object upon a determination that the user context object has not been accessed within a pre-determined threshold period of time, the resources including at least one of memory, data communications devices, processor time and network bandwidth.

Still yet another aspect of the present invention provides a system to facilitate a remote user accessing an application across a stateless protocol comprising: a component for caching data associated with the remote user access, the data comprising state and/or user specific information; and a component for managing memory storing the state and/or user specific information, wherein the memory managing component reclaims resources allocated to a user context object upon a determination that the user context object has not been accessed within a pre-determined threshold period of time, the resources including at least one of memory, data communications devices, processor time and network bandwidth, and a monitoring component, operable to feedback information concerning usage of one or more user context objects.

Still yet another aspect of the present invention provides a system to facilitate a remote user accessing an application across a stateless protocol comprising: a component for caching data associated with the remote user access, the data comprising state and/or user specific information, and a component for managing memory storing the state and/or user specific information, wherein the memory managing component reclaims resources allocated to a user context object upon a determination that the user context object has not been accessed within a pre-determined threshold period of time, the resources including at least one of memory, data communications devices, processor time and network bandwidth, wherein the pre-determined threshold period of time can be dynamically changed based, at least in part, on feedback concerning the usage of one or more user context objects.

Yet another aspect of the present invention provides a method for facilitating remote access to an application, the access occurring across a stateless protocol, the method comprising: allocating memory to cache state and/or user specific information associated with the remote access; caching the state information associated with the remote access of the application in the allocated memory; and caching the user specific information associated with the remote access of the application in the allocated memory.

Still yet another aspect of the present invention provides a method for facilitating remote access to an application, the access occurring across a stateless protocol, comprising: allocating memory to cache state and/or user specific information associated with the remote access; caching the state information associated with the remote access of the application in the allocated memory; caching the user specific information associated with the remote access of the application in the allocated memory, and selectively reclaiming the memory allocated to cache the state and/or user specific information associated with the remote access, the reclaiming occurring upon the allocated memory not being accessed within a predetermined period of time.

Yet another aspect of the present invention provides a data packet adapted to be transmitted between two or more computer processes comprising; information related to facilitating remote access to an application, the access occurring across a stateless protocol, the information comprising state and/or user specific information associated with the remote access of the application.

Still another aspect of the present invention provides a computer readable medium storing computer executable components of a system to facilitate a remote user accessing an application across a stateless protocol, the components including a component for caching data associated with the remote user access, the data comprising state and/or user specific information.

Another aspect of the present invention provides a computer readable medium storing computer executable instructions operable to execute a method for facilitating remote access to an application, the access occurring across a stateless protocol, the method comprising: allocating memory to cache state and/or user specific information associated with the remote access; caching the state information associated with the remote access of the application in the allocated memory; and caching the user specific information associated with the remote access of the application in the allocated memory.

Yet another aspect of the present invention provides a computer readable medium storing computer executable instructions operable to execute a method for facilitating remote access to an application, the access occurring across a stateless protocol, the method comprising: allocating memory to cache state and/or user specific information associated with the remote access; caching the state information associated with the remote access of the application in the allocated memory; caching the user specific information associated with the remote access of the application in the allocated memory and selectively reclaiming the memory allocated to cache the state and/or user specific information associated with the remote access, the reclaiming occurring upon the allocated memory not being accessed within a pre-determined period of time.

Still yet another aspect of the present invention provides a system for managing information in an application accessed via a stateless protocol, comprising: means for allocating memory to store state and/or user specific information associated with a remote user access of an application, the application being accessed via a stateless protocol; means for caching, in the allocated memory, state information associated with the remote access of the application; means for caching, in the allocated memory, user specific information associated with a remote accessor of the application; means for locating the state and/or user specific information cached in the allocated memory; and means for reclaiming the allocated memory when the memory has not been accessed within a predetermined period of time.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
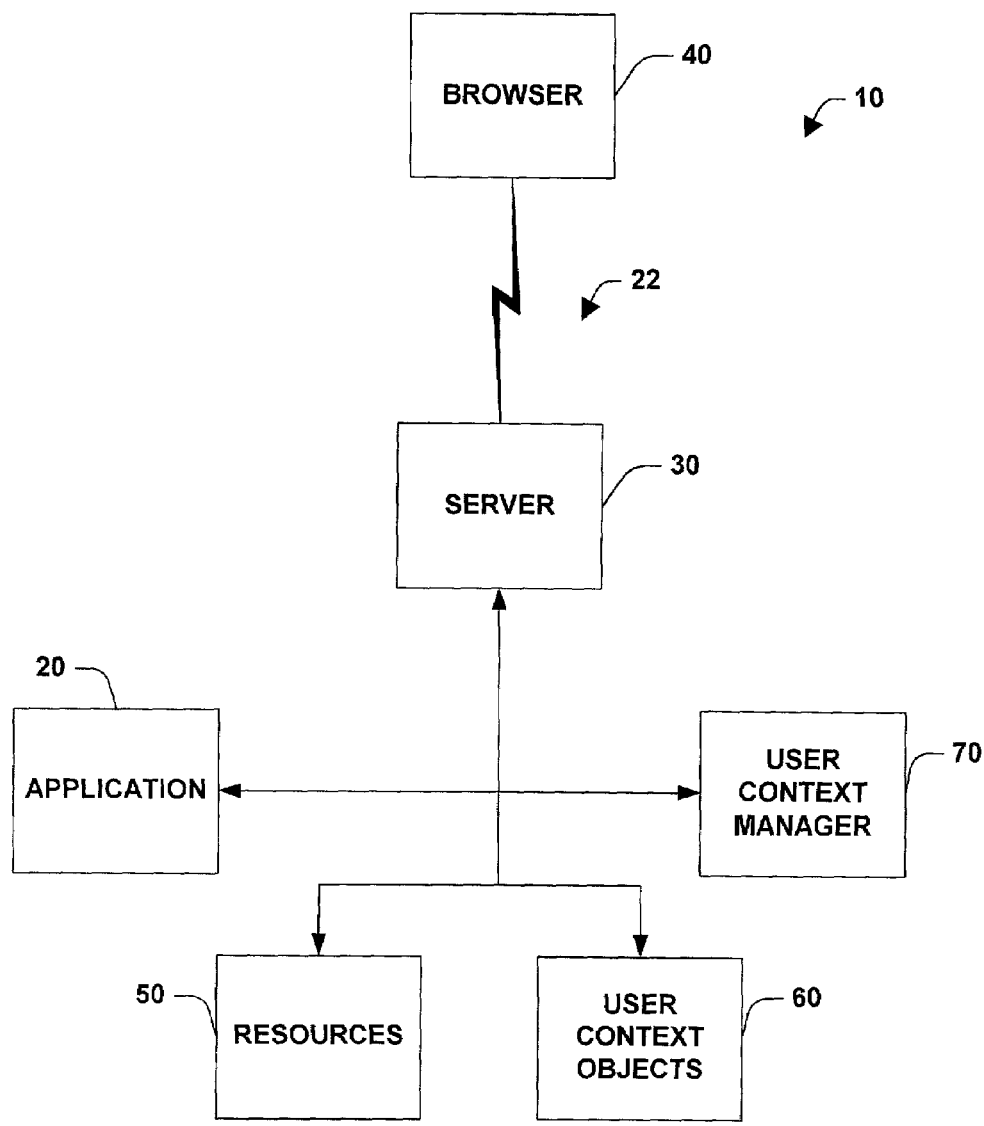
FIG. 1 is schematic block diagram illustrating a system for managing state and/or user specific information for applications accessed over stateless protocols, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

Referring initially to FIG. 1, a system 10 for managing state, and/or user, information associated with an application 20 accessed via a stateless protocol 22 is illustrated. The application can be, for example, email, chat sessions, database programs, video games, web-enabled applications and search engines. Although six applications are listed above, it is to be appreciated by one skilled in the art that any application for which tracking state and/or user information is beneficial may be employed with the present invention. The application 20 can be hosted by a server 30. The server 30 can be, for example, a personal computer, a workstation, and one or more distributed machines co-operating in serving the application 20. The stateless protocol 22 can be, for example, a Hypertext Transfer Protocol (HTTP). The user information associated with the application 20 can include, but is not limited to, a record of views accessible to the remote user, a record of views recently displayed to the remote user, a record of folders recently accessed by the remote user, a record of URLs for folders commonly accessed by the remote user, and legacy and SMTP addresses for the remote user. The state information associated with the application 20 can include, but is not limited to, a record of one or more entities involved in a process requiring multiple requests from the remote user via the stateless protocol. While the user and state information is described, in part, as being associated with one or more records (e.g. a record of views), it is to be appreciated by one skilled in the art that any suitable data structure, and/or data storage method, can be employed in accordance with the present invention. Such data structures can include, but are not limited to, lists, linked lists, arrays, objects, records, database records, fields, files and trees.

The application 20 may be accessed by a remote user employing a browser 40 (e.g. Internet Explorer). The browser 40 and the server 30 may communicate via the stateless protocol 22. For example, stateless protocol 22 requests and/or responses may travel between the browser 40 and the server 30. Conventionally, communicating with an application via the stateless protocol 22 hampered maintaining state and/or user specific information concerning the remote access of the application 20. Since state and/or user information was difficult to maintain, the application 20 available via the stateless protocol may have been limited in its capabilities, and/or capacities.

One or more resources 50 may be associated with the application 20. The resources can include, but are not limited to memory, network bandwidth, processor time and communication devices. The server 30 can manage the resources 50 that are allocated to the application 20. For example, the application 50 may require one megabyte of memory to store a data structure, and the server 30 may allocate the one megabyte of memory to the application 20 from the resources 50. Efficient management of the resources 50 is facilitated if the application 20 can track user and/or state specific information associated with the remote user of the browser 40 accessing the application 20. For example, the application 20 may require an initial large allocation of memory for a remote user, but then may require separate smaller allocations of memory for subsequent sessions from the same remote user. Conventionally, tracking users and sessions was difficult to achieve. Thus, the subsequent smaller allocations may not have been available, requiring larger allocations, thereby reducing application efficiency. The present invention, by facilitating tracking whether a user is running more than one session, and tracking what resources, if any, are allocated to that user, can improve the efficiency of resource allocation for the application 20.

The application 20 can be an application that can be accessed by more than one remote user. Thus, the application 20 may have resources 50 allocated for the more than one remote user. The present invention facilitates tracking the resources 50 allocated to the different remote users by facilitating maintaining user information. By way of illustration, with user and state information available a relatively simple algorithm may be employed to locate resources associated with a user, and/or a session, rather than a relatively complicated conventional algorithm. For example, the user context object can contain a pointer to the resources, which is a simple address lookup, while conventionally, a table of resources may need to be searched to locate resources.

Similarly, a remote user may interact with the application 20 through more than one session of the browser 40. Thus, the application 20 may have resources 50 allocated for the more than one session for the remote user who is accessing the application 20 by more than one browser 40 session. For example, a remote user may have one browser session active through which the remote user is accessing a first email account assigned to a first user name for the remote user, the first account being handled by the application 20. The remote user may also have another browser session active through which the remote user is accessing a second email account assigned to a second user name for the remote user, the second account also being handled by the application 20.

With continuing reference to FIG. 1, one or more user context objects 60 (UCO) can be created to facilitate tracking the state and/or user specific information employed by the application 20. The user context objects 60 can be managed by a user context manager 70. The user context manager 70 can be responsible for actions including, but not limited to, initializing the user context objects 60, for maintaining the user context objects 60 and/or for reclaiming memory from user context objects 60 that are no longer tracking state and/or user information for a remote user, for example. In one example aspect of the present invention, the user context manager 70 can monitor how long it has been since a user context object 60 was accessed, and if the period of time exceeds a predetermined threshold (e.g. one hour), then the user context manager 70 can reclaim the memory allocated for the user context object 60. In another example aspect of the present invention, the user context manager 70 can adjust the period of time during which a user context object 60 can go without being accessed before the memory allocated to the user context object 60 is reclaimed. For example, if the server 30 is running near its capacity, then the period of time may be reduced. But if the server 30 is not running substantially near its capacity, then the period of time may be increased. Thus, the present invention provides a dynamically self-configuring user context manager 70 responsive to the load being borne by the server 30.

Figure 2:
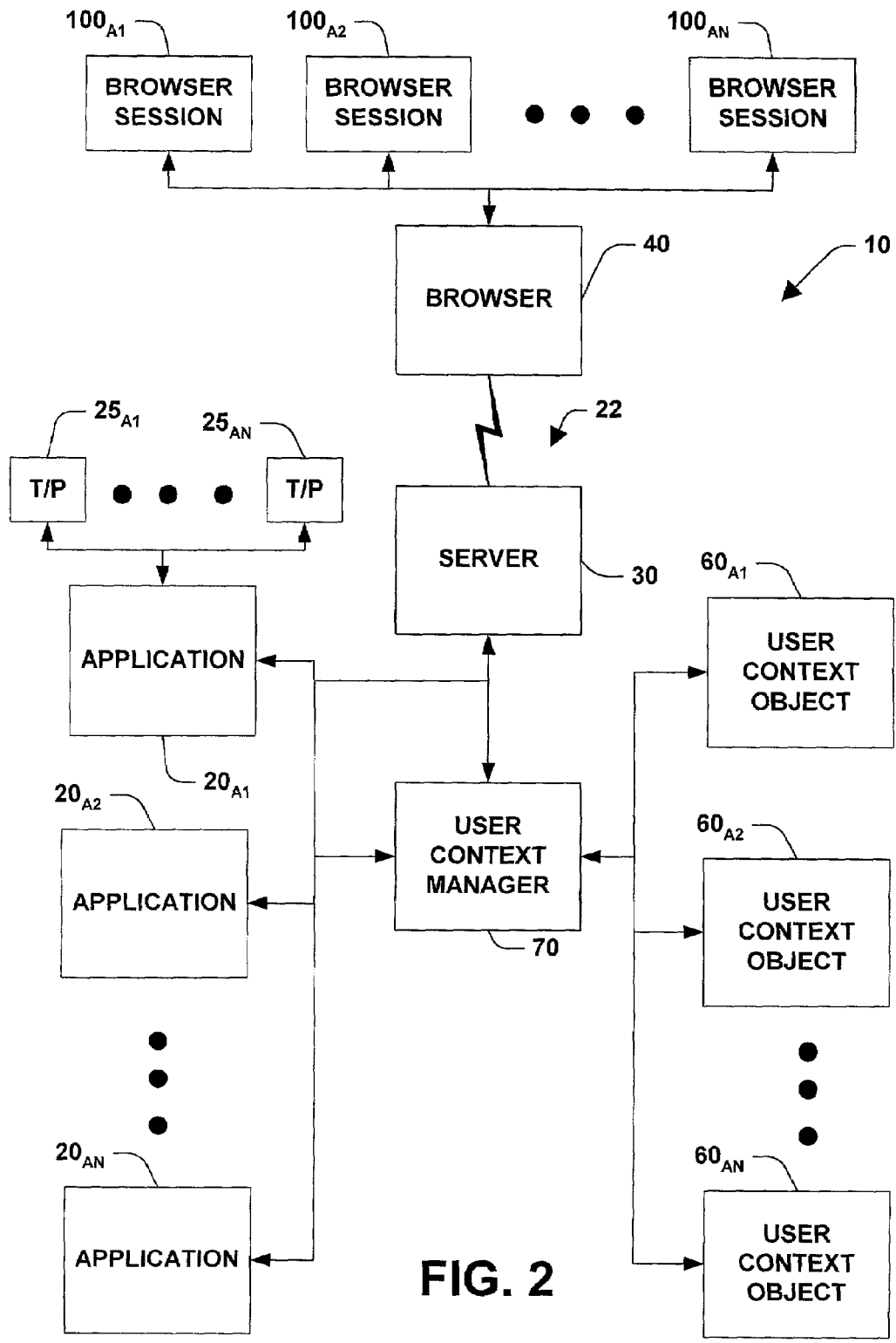
FIG. 2 is a schematic block diagram further illustrating a system for managing state and/or user specific information for applications accessed over stateless protocols, in accordance with an aspect of the present invention.

Turning now to FIG. 2, the system 10 for managing state and/or user specific information for the application 20 (FIG. 1) accessed over the stateless protocol 22 is further illustrated. The application 20 may be, for example, an email application, a calendar application and/or a task list application. Remote users can access one or more applications $20_{A1}$, $20_{A2}$ through $20_{AN}$ (collectively the applications 20A) via the stateless protocol 22. Remote users may access the applications 20A from one or more browser sessions $100_{A1}$, $100_{A2}$ through $100_{AN}$ (collectively the sessions 100A). The applications 20A may be associated with one or more threads of execution or processes 25. For example, the application $20_{A1}$ may be associated with the threads $25_{A1}$, $25_{A2}$ through $25_{AN}$. Thus, for an application accessible via the stateless protocol 22, a complicated environment including the sessions 100A, the applications 20A and the threads 25A can exist. To improve the functionality of the applications 20A, the present invention facilitates creating one or more user context objects $60_{A1}$, $60_{A2}$ through $60_{AN}$ (collectively the user context objects 60A) operable to store state and/or user specific information about remote users and associated sessions. The user and/or state information stored in the user context objects 60A can be employed for tasks including, but not limited to, tracking associations between applications and sessions, tracking associations between applications, tracking progress through a thread and/or process, tracking actions taken by remote users and/or browser sessions, and locating resources associated with sessions, applications, threads and/or processes, for example. Such actions may be carried out by a relatively simple operation of, for example, resolving pointers stored in the user context objects 60A. Conventionally, with no user context objects 60A, if it was possible to perform tasks like tracking associations between threads and browser sessions, relatively complicated operations like string parsing, table lookups and/or tree searches, for example, were required. Thus, the present invention mitigates delay problems found in conventional systems.

Figure 3:
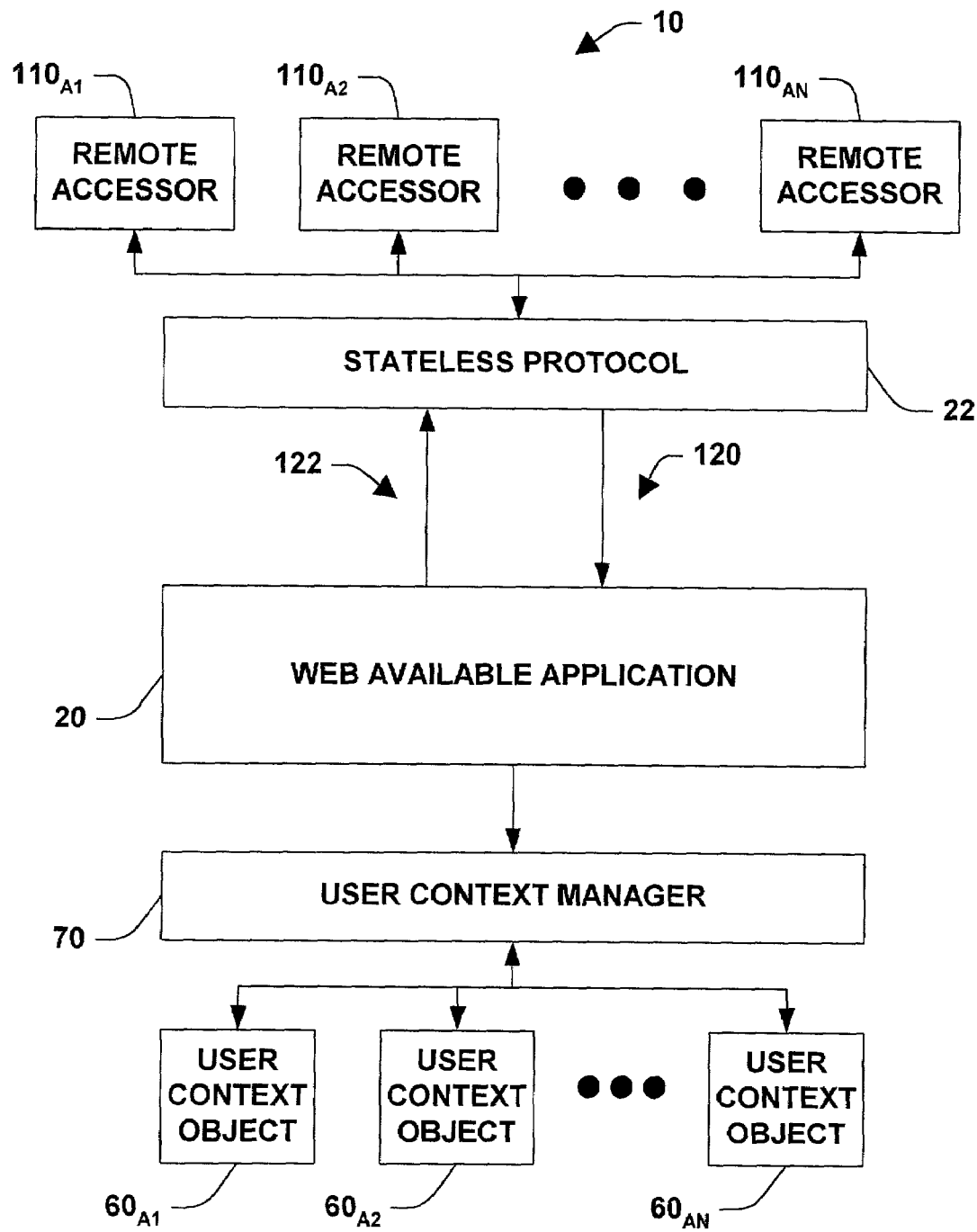
FIG. 3 is a schematic block diagram illustrating the system for managing state and/or user specific information for applications accessed via stateless protocols, the system including a feedback and monitoring component operable to monitor usage of one or more user context objects.

Turning now to FIG. 3, a schematic block diagram further illustrates the system 10 for managing state and/or user specific information for the application 20 accessed via a stateless protocol 22. One or more remote accessors $110_{A1}$, $110_{A2}$, through $110_{AN}$ (collectively the remote accessors 110A) access the application 20 via the stateless protocol 22. The remote accessors 110A can send requests 120 to the application 20 via the stateless protocol and can receive responses 122 from the application 20 via the stateless protocol. The requests 120 and responses 122 can be employed to carry information that facilitates storing state and/or user specific information in the one or more user context objects 60A. One or more operations desired by the remote accessors 110A may require multiple requests 120, and/or responses 122. For example, moving messages from a first email folder to a second email folder may require multiple requests 120, and/or responses 122, via the stateless protocol 22. Processing such multiple requests 120, and/or responses 122, can be simplified if state, and/or user, specific information is available to the application 20 and does not, therefore, have to be sent back and forth between the application 20 and the remote accessors 100A. Thus, by facilitating tracking state and/or user specific information, the functionality and the efficiency of the application 20 can be improved.

Figure 4:
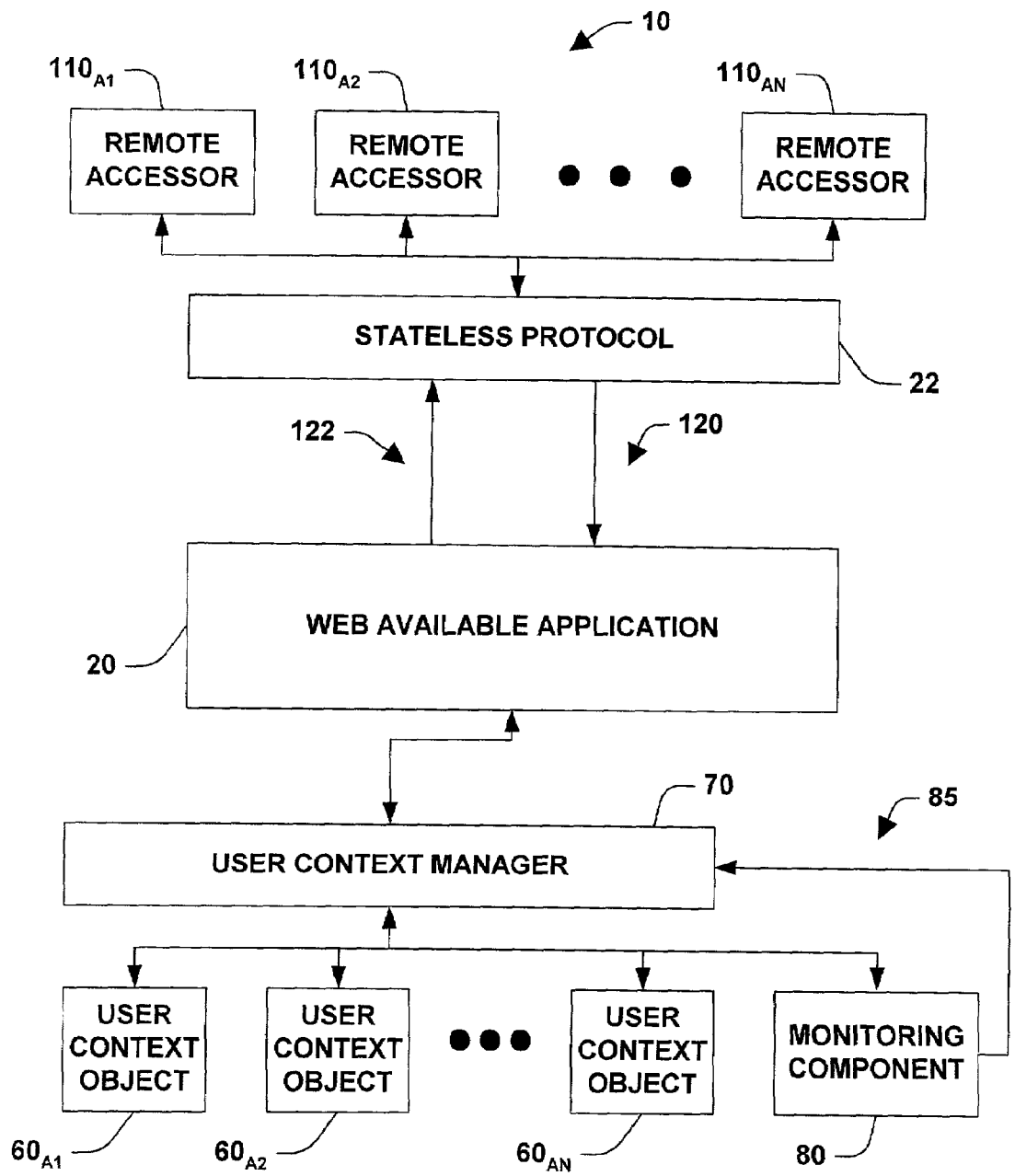
FIG. 4 is a schematic block diagram illustrating a system for managing state and/or user specific information for an application accessed over a stateless protocol, in accordance with an aspect of the present invention.

FIG. 4 is a schematic block diagram further illustrating the system 10 for managing state, and/or user, specific information for the application 20 accessed via a stateless protocol 22, the system 10 including a feedback and monitoring component 80 operable to monitor usage of one or more user context objects 60 and to produce feedback information 85.

A remote accessor $110_{A1}$ may create a browser session, perform some action, and then not perform other actions from that session. For example, the remote accessor $110_{A1}$ may start a browser session, access an email application, read a message and then start some other activity (e.g word processing), leaving the browser session active and connected to the email application. The user context object $60_{A1}$ may have been allocated to track state, and/or user, specific information associated with the remote accessor $110_{A1}$. With a finite set of resources available to allocate to the user context objects 60A, monitoring the usage of the one or more user context objects 60A can improve the performance of the application 20 and the system 10 for tracking state and/or user information. For example, if the user context manager 70 determines, based at least in part on the feedback information 85 provided by the monitoring component 80, that one or more of the user context objects 60A have not been accessed for a pre-determined period of time (e.g. one hour), then the user context manager 70 can reclaim the resources allocated to the one or more user context objects 60A. The resources can include, but are not limited to, memory, processor cycles, data communication devices and data communications bandwidth. Thus, for example, the memory allocated to the user context object $60_{A1}$, associated with the browser session abandoned when the remote user started another task, which browser session has not caused an access of the user context object $60_{A1}$ in more than a pre-determined period of time, can be reclaimed. Such reclamation can improve the efficiency of the system 10 managing the state and/or user information.

By way of further illustration, with the complicated mix of remote accessors 100A (FIG. 2), applications 20A (FIG. 2) and/or threads/processes 25A (FIG. 2) possible, and the possibility of a correspondingly complicated set of user context objects 60A, the user context manager 70 can be employed, in an example aspect of the present invention, to manage the user context objects 60A by, for example, shifting resources between one or more user context objects 60A based, at least in part, on the feedback information 85 provided by the monitoring component 80. If the user context manager 70 determines that some user context objects 60A are being accessed more frequently than other user context objects 60A, then the user context manager 70 may attempt to reallocate resources between the user context objects 60A. The resources can include, but are not limited to, memory, processor cycles, data communications devices and data communications bandwidth. Such reallocation can improve the efficiency of the application 20 and the system 10 managing the state and/or user information.

In an example aspect of the present invention, the user context manager 70 may dynamically adjust one or more pre-determined thresholds based, at least in part, on the feedback information 85 available from the monitoring component 80. For example, if the user context manager 70 determines that the server 30 (FIG. 2) is operating near capacity (e.g. 80%), then the user context manager 70 may reduce the period of time after which a user context object 60 will be reclaimed if the user context object 60 is not accessed. Similarly, if the user context manager 70 determines that the server 30 (FIG. 2) is operating with a relatively light load (e.g. 10%) then the user context manager 70 may increase the period of time after which a user context object 60 will be reclaimed if the user context object 60 is not accessed.

Figure 5:
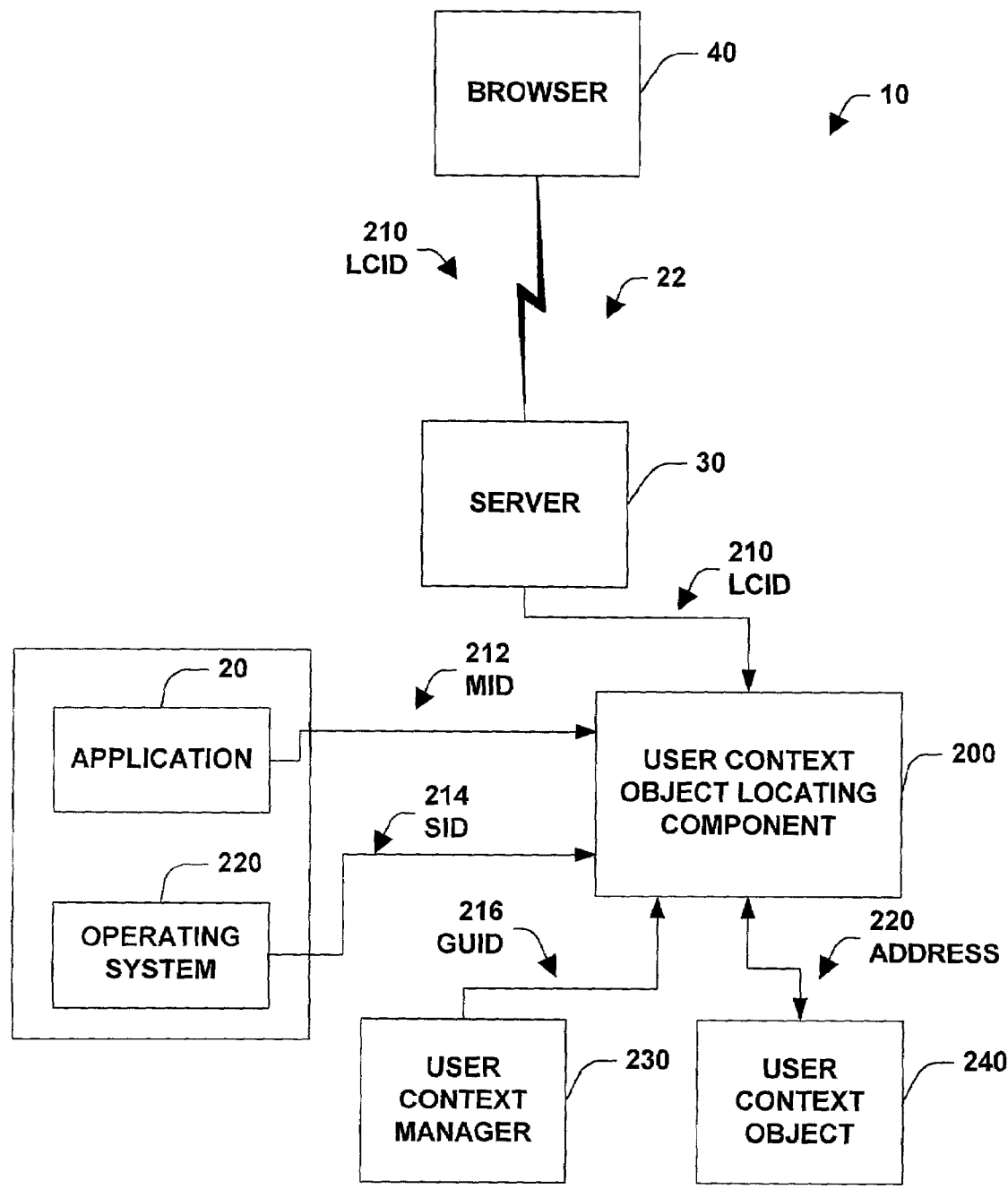
FIG. 5 is a schematic block diagram illustrating a user context object locating component addressing a user context object, in accordance with an aspect of the present invention.

Turning now to FIG. 5, a schematic block diagram illustrates a user context object locating component 200 receiving inputs sufficient to locate a user context object 240. A remote accessor may access the application 20 through a browser 40. The remote accessor may configure the browser 40 to personal preferences. Thus, the browser 40 can have locale information including, but not limited to, display language, character set, time zone, and current time. A locale identifier 210 (LCID) can be associated with such information and can be sent, via the stateless protocol 22, from the browser 40 to the user context object locating component 200 in one or more requests.

The application 20 can also have an identifier associated with the remote accessor. For example, an email application can have a mailbox identifier 212 (MID) associated with the remote accessor. The MID 212 may be generated by processing a (domain name, username, password) combination, for example. Once generated, the MID 212 can be passed to the user context object locating component 200.

An operating system 220 can support running the application 20. The operating system 220 can have a security identifier 214 (SID) associated with the remote accessor. For example, a (username, password) combination may be resolved to determine the authenticity of the remote accessor, and upon such determination, the SID 214 can be assigned.

A user context manager 230 can support managing a context object 240. As the user context object 240 is created, a globally unique identifier 216 (GUID) can be assigned to the user context object 240. The GUID 216 can also be passed to the user context object locating component 200. Thus, the user context object locating component 200 can access several pieces of information available (e.g. LCID, MID, SID, GUID). With such information available, the user context object locating component 200 can employ an algorithm to locate the user context object 240. By way of illustration, the GUID 216 may identify a machine upon which the user context object 240 resides, the SID 214 may identify a pool of user context objects assigned to an organization of users being served by the machine identified by the GUID 216 and the user from that organization generating a request. The MID 212 may identify the application 20 to which the request is directed, and may provide an index for a table lookup in that application 20, while the LCID 210 may help identifying a browser session associated with a request.

The LCID 210, the MID 212, the SID 214 and the GUID 216 can thus be employed to efficiently and uniquely identify the user context object 240 holding state and/or user specific information thus facilitating maintaining state and/or user specific information for an application accessed via a stateless protocol.

Figure 6:
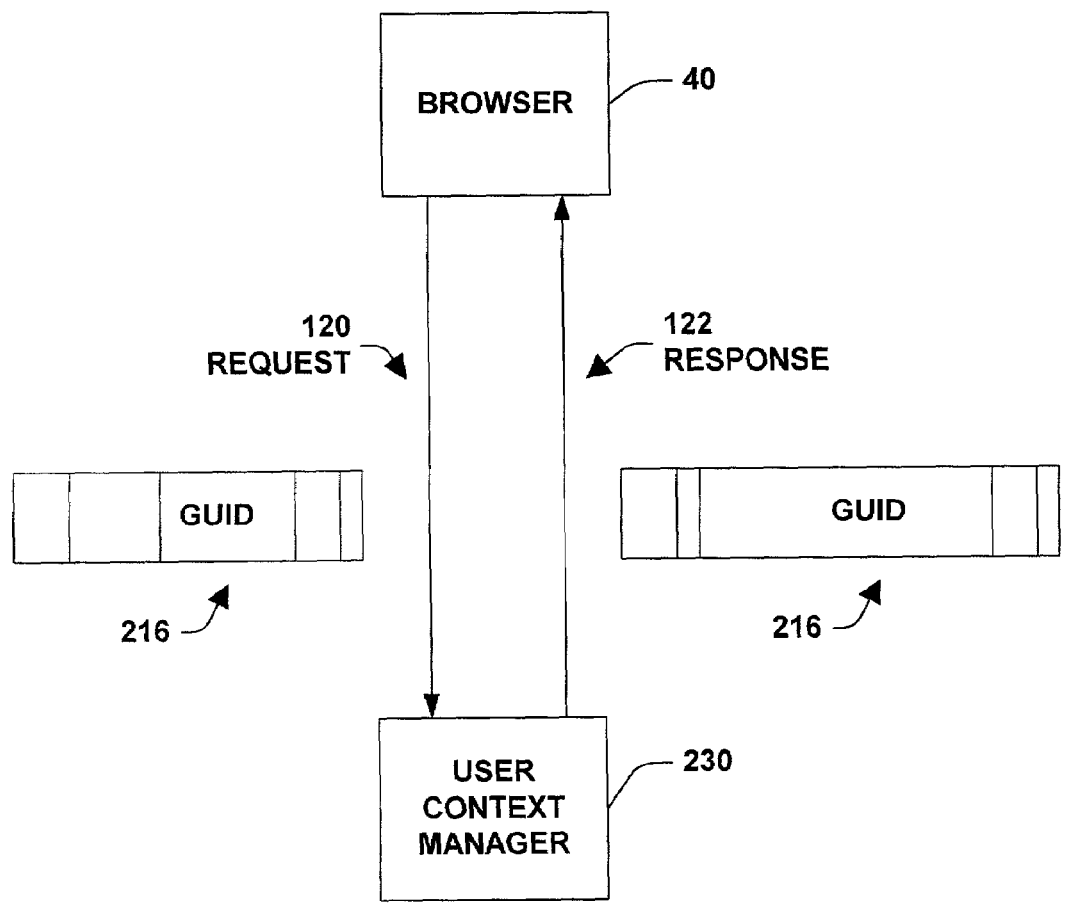
FIG. 6 illustrates stateless protocol requests and responses carrying a Globally Unique Identifier (GUID), in accordance with an aspect of the present invention.

FIG. 6 illustrates a stateless protocol request 120 and response 122, the request 120 and the response 122 carrying a globally unique Identifier 216 (GUID). As mentioned above, a user context manager 230 can support managing a user context object 240 (FIG. 5). As the user context object 240 is created, the globally unique identifier 216 (GUID) can be assigned to the user context object 240. As described in the discussion accompanying FIG. 5, the GUID 216 can be employed in locating a user context object 240 (FIG. 5). Similarly, other identifiers (e.g., SID 214, MID 212, LCID 210) can be employed to locate the user context object 240. When a SID 214 is available, the SID 214 can be maintained in the operating system 220 (FIG. 5) supporting the application 20 (FIG. 5) at the server side. Similarly, when an MID 212 is available, the MID 212 can be maintained in the application 20 at the server side. When an LCID 210 is available, the LCID 210 is typically transmitted with each stateless protocol 22 request 120. But it is the combination of the multiple identifiers (e.g. LCID 210, MID 212, SID 214, GUID 216) that facilitate efficiently and uniquely identifying the user context object 240. Further, the GUID 216 may not be readily retrievable by the application 20, the operating system 220, and/or the browser 40. Thus, in an example aspect of the present invention, the GUID 216 is sent from the application 20 side to the remote accessor side in the response 122. On subsequent requests 120 the GUID 216 is sent from the remote accessor side to the application side. Thus, the GUID 216 is available to facilitate retrieving user context objects, which facilitates tracking state and/or user information for applications accessed via a stateless protocol. In an example aspect of the present invention, the GUID 216 can be transported in space conventionally employed for managing persistent and/or per session client side hypertext files ("cookies").

Figure 7:
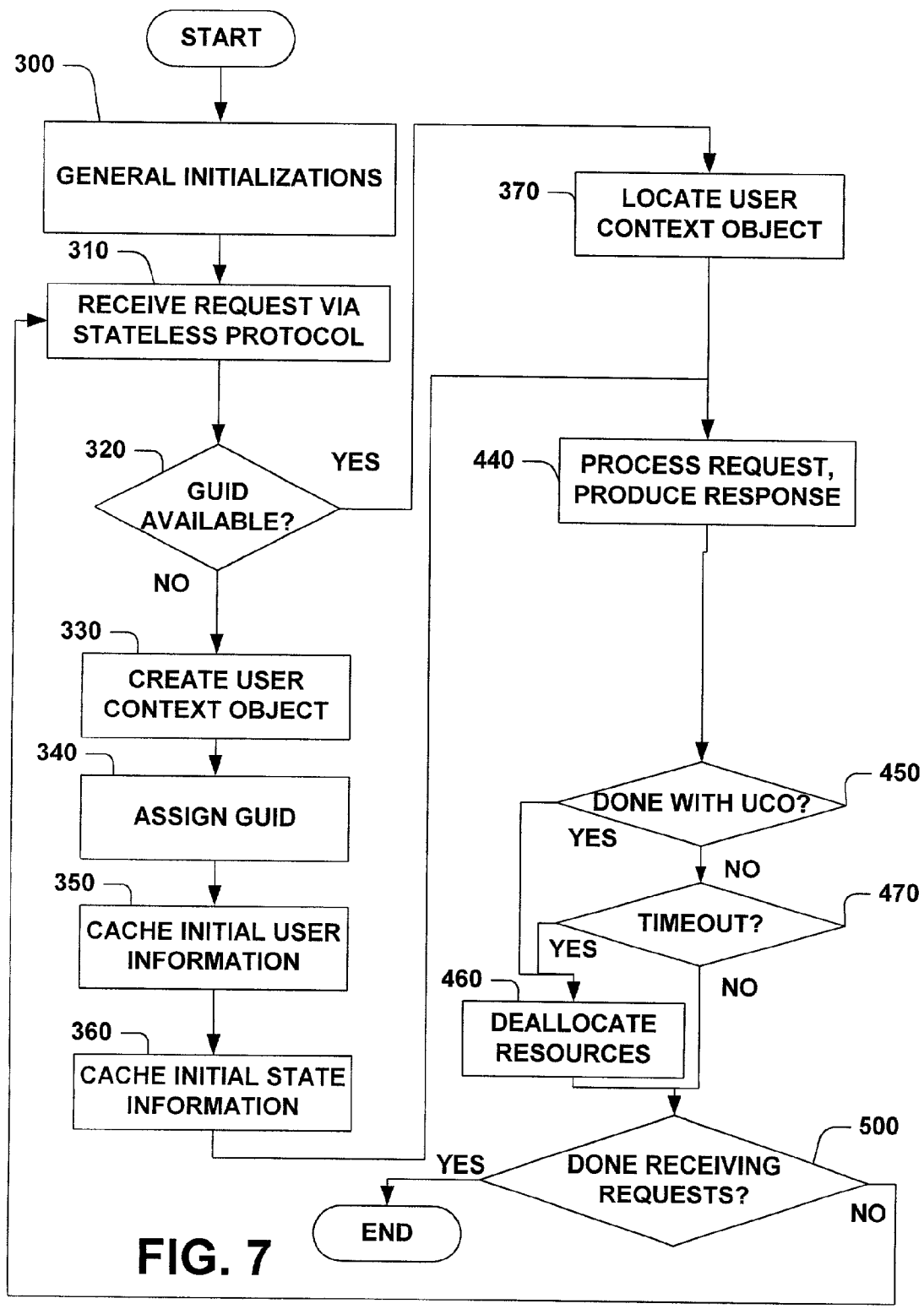
FIG. 7 is a flow chart illustrating a method for managing state and/or user information for an application accessed via a stateless protocol, in accordance with an aspect of the present invention.
Figure 8:
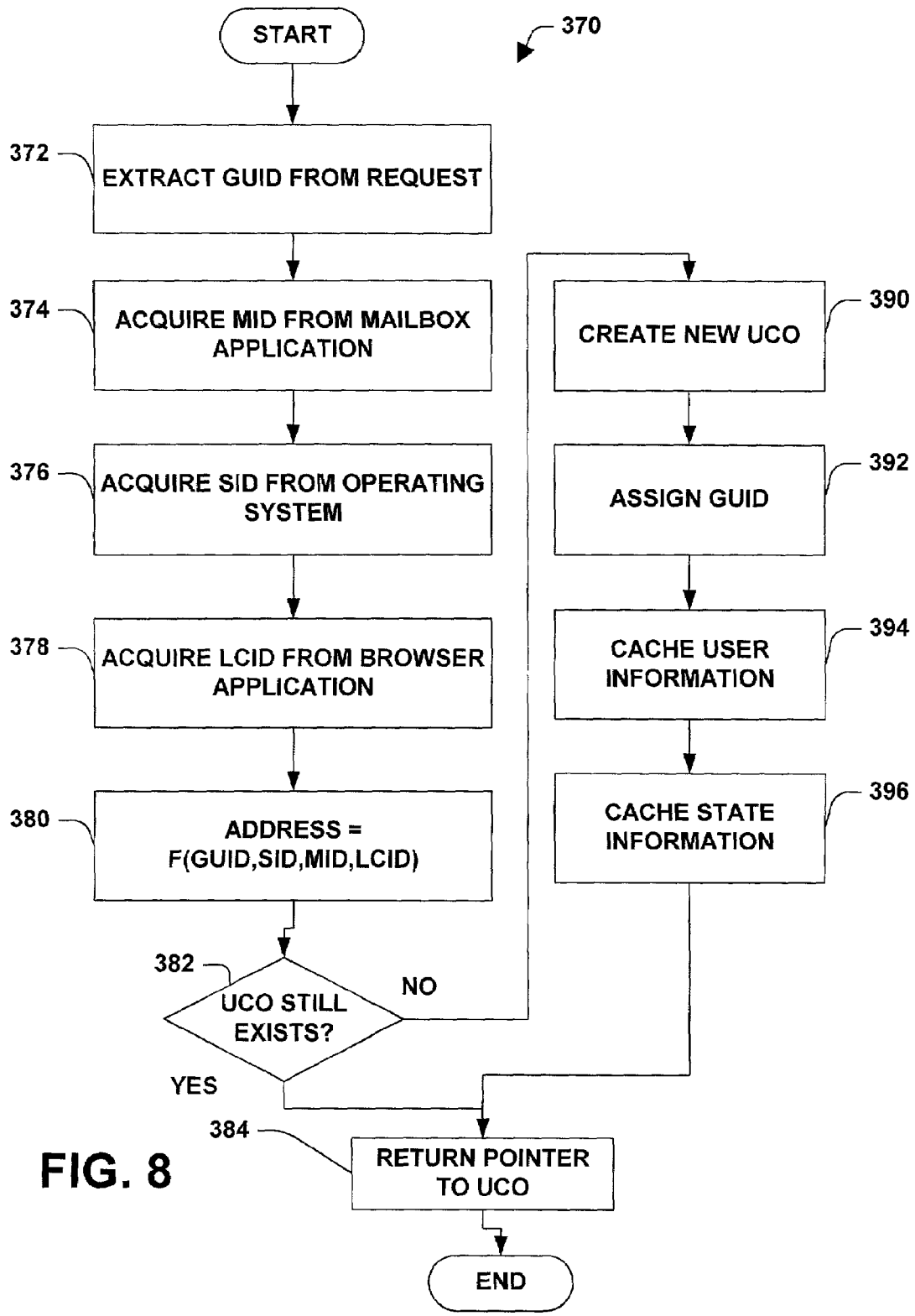
FIG. 8 is a flow chart illustrating a method for locating a user context object, in accordance with an aspect of the present invention.

In view of the exemplary systems shown and described above, a methodology, which may be implemented in accordance with the present invention, will be better appreciated with reference to the flow diagrams of FIGS. 7 and 8. While, for purposes of simplicity of explanation, the methodologies of FIG. 7 and FIG. 8 are shown and described as a series of steps. It is to be understood and appreciated that the present invention is not limited by the order of the steps, as some steps may, in accordance with the present invention, occur in different orders and/or concurrently with other steps from that shown and described herein. Moreover, not all illustrated steps may be required to implement a methodology in accordance with the present invention.

Turning now to FIG. 7, a flow chart illustrates a method for managing state and/or user specific information for an application accessed via a stateless protocol. At step 300, general initializations are performed. Such initializations can include, but are not limited to, establishing pointers, determining locations of available memory, setting counters to initial values, determining current loads, determining what communications devices and/or services are available, determining what applications are available, identifying processes and/or threads associated with applications, determining what operating systems are available and determining whether a feedback control component is available, for example.

At step 310, a request is received via a stateless protocol. The request may be associated with a remote accessor, who may be accessing an application via the stateless protocol. For example, a remote accessor may send a request, via the stateless protocol, to an email application, the request asking to view an email folder. At step 320, a determination is made whether a globally unique identifier GUID is available in the request. If the determination at step 320 is NO, then in one example aspect of the present invention the absence of the GUID can indicate that no user context object is associated with the remote access and the application with which the remote access seeks to interact. Thus, at step 330, a user context object is created. At step 340, a GUID is created and assigned to the user context object of step 330. At step 350, initial user information is cached in the user context object of step 330, which can be addressed in part by the GUID of step 340. At step 360, initial state information is similarly cached in the user context object of step 330, which can be addressed in part by the GUID of step 340. Thus, if the determination at step 320 was NO, then a user context object is created and mapped to the remote accessor and application with which the remote accessor seeks to interact.

If the determination at step 320 was YES, that a GUID was available in the request received at step 310, then at step 370 the user context object associated with the GUID will be retrieved. Step 370 will be flow-charted in greater detail in FIG. 8.

At step 440 the request is processed and a response is produced. With user and/or state information available, more sophisticated requests can be processed than would be conventionally possible for an application accessed via a stateless protocol, thus facilitating the functionality and efficiency of such an application.

At step 450, a determination is made concerning whether processing associated with the user context object is complete. For example, the application may have reached a state where no more interactions are possible with the user context object, and/or the request indicated that the remote access was terminating, and thus the user context object will no longer be necessary. If at step 450 the determination is YES, then at step 460 the resources allocated to the user context object can be de-allocated. Resources including, but not limited to memory, communications devices, network bandwidth and/or processor time, for example, can be reclaimed. Thus, the efficiency of maintaining state and/or user information for an application accessed via a stateless protocol can be improved.

If at step 450 the determination is NO, then at step 470 a determination can be made concerning whether a timeout condition exists for one or more user context objects. Such a determination can be made, for example, by a background thread that can be independent from the lookup process. For example, if a user context object has not been accessed for a pre-determined period of time, then the resources allocated to that user context object can be reclaimed. If the determination at step 470 is YES, then at step 460 such resource de-allocation occurs.

At step 500, a determination is made concerning whether the method is done receiving requests. If the determination at step 500 is YES, then processing concludes, otherwise the method returns to step 310 to receive the next request via the stateless protocol.

Turning now to FIG. 8, step 370 (FIG. 7), which deals with locating a user context object, is flow-charted in greater detail. Locating a user context object can involve passing one or more identifiers to an algorithm for combining the identifiers to generate an address of a memory location, for example. Thus, at step 372, the globally unique identifier (GUID) is extracted from the request received at step 310 (FIG. 7). In an example aspect of the present invention, where the application being accessed via a stateless protocol is an email application, then at step 374 a mailbox identifier (MID) can be acquired. At step 376, a security identifier (SID) can be acquired from an operating system supporting the application being accessed via the stateless protocol. At step 378, a locale identifier (LCID) can be acquired from the browser being employed by the remote accessor. Once the identifiers of step 372, 374, 376 and 378 have been acquired, then at step 380 an address for the user context object can be generated. It is to be appreciated by one skilled in the art that the address may be a physical address, a virtual address, or any type of address suitable to locate an object in memory.

At step 382, a determination is made concerning whether the user context object whose address was generated at step 380 still exists since the user context object may have been reclaimed due to actions including, but not limited to, a time out condition (e.g. step 470, FIG. 7). If the determination at step 382 is YES, that the user context object whose address was generated at step 380 still exists, then at step 384 the pointer and/or address associated with the user context object can be returned. If the determination at step 382 is NO, then at step 390 a user context object can be created to store user and/or state information associated with the remote accessor. At step 392 a new GUID can be generated, the GUID operable to facilitate locating the user context object created at step 390. At step 394, user information can be cached in the user context object of step 390, and at step 396 state information can be cached in the user context object of step 396. At step 384, a pointer and/or address associated with the user context object created at step 390 can be returned.

Although four identifiers (e.g. GUID, MID, SID, LCID) are described in association with the method flow charted for steps 372 through 396, it is to be appreciated by one skilled in the art that a greater or lesser number of identifiers may be employed in accordance with the present invention. For example, although a mailbox identifier (MID) is discussed in association with step 374, other identifiers including, but not limited to, a chat session identifier, a search engine identifier, a database identifier, and a video game identifier can be employed in accordance with the present invention, for example.

Figure 9:
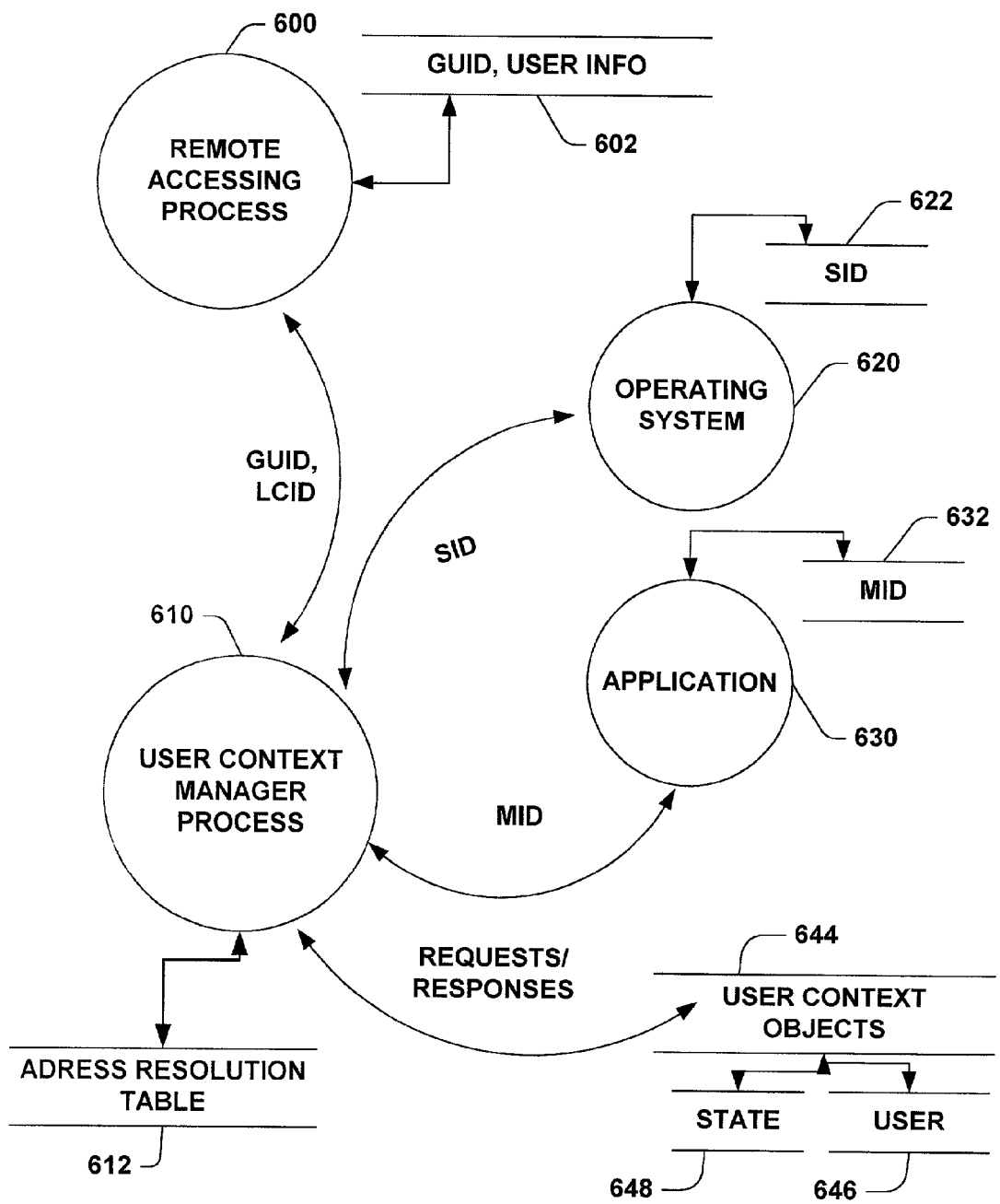
FIG. 9 is a data flow diagram illustrating a data flow through a system for managing states for an application accessed via a stateless protocol, in accordance with an aspect of the present invention.

Turning now to FIG. 9, a data flow through a system for managing states and/or user information for an application accessed via a stateless protocol is illustrated. A remote accessing process 600 can generate requests that will pass to an application 630 via a stateless protocol and can receive responses back from the application 630 via the stateless protocol. The remote accessing process 600 can store information including, but not limited to, a GUID and user information, in a remote accessing process data store 602. The remote accessing process 600 may also be associated with a locale identifier. The remote accessing process 600 can send requests, which can include the GUID and the LCID to a user context manager process 610. The user context manager process 610 may also receive information from an operating system 620 and an application 630. The operating system 620 can, for example, store a security identifier 622 (SID) and send the SID 622 to the user context manager process 610. The security identifier may have been generated by processing a (username, password) combination, for example. Similarly, the application 630 may have an identifier available to send to the user context manager process 610. For example, if the application 630 is a mail box application, then the mail box application may have a mail box identifier 632 (MID) available. The mail box identifier may have been generated by processing a (username, password, domain name, alias) combination, for example. The user context manager process can examine the available identifiers (e.g. GUID, LCID, SID, MID) and access an address resolution table 612 to determine which user context object 644, if any, corresponds to the combination of identifiers. If a user context object 644 is located, then the user context manager process 610 can access state information 648 and/or user information 646 associated with the user context object 644. Having state information 648 and/or user information 646 available facilitates increasing the functionality of the application 630 that can be accessed via a stateless protocol. For example, maintaining user information 646 can reduce processing required to determine what user is accessing the application 630. Similarly, maintaining state information 648 can reduce processing required to perform multi-step operations.

Figure 10:
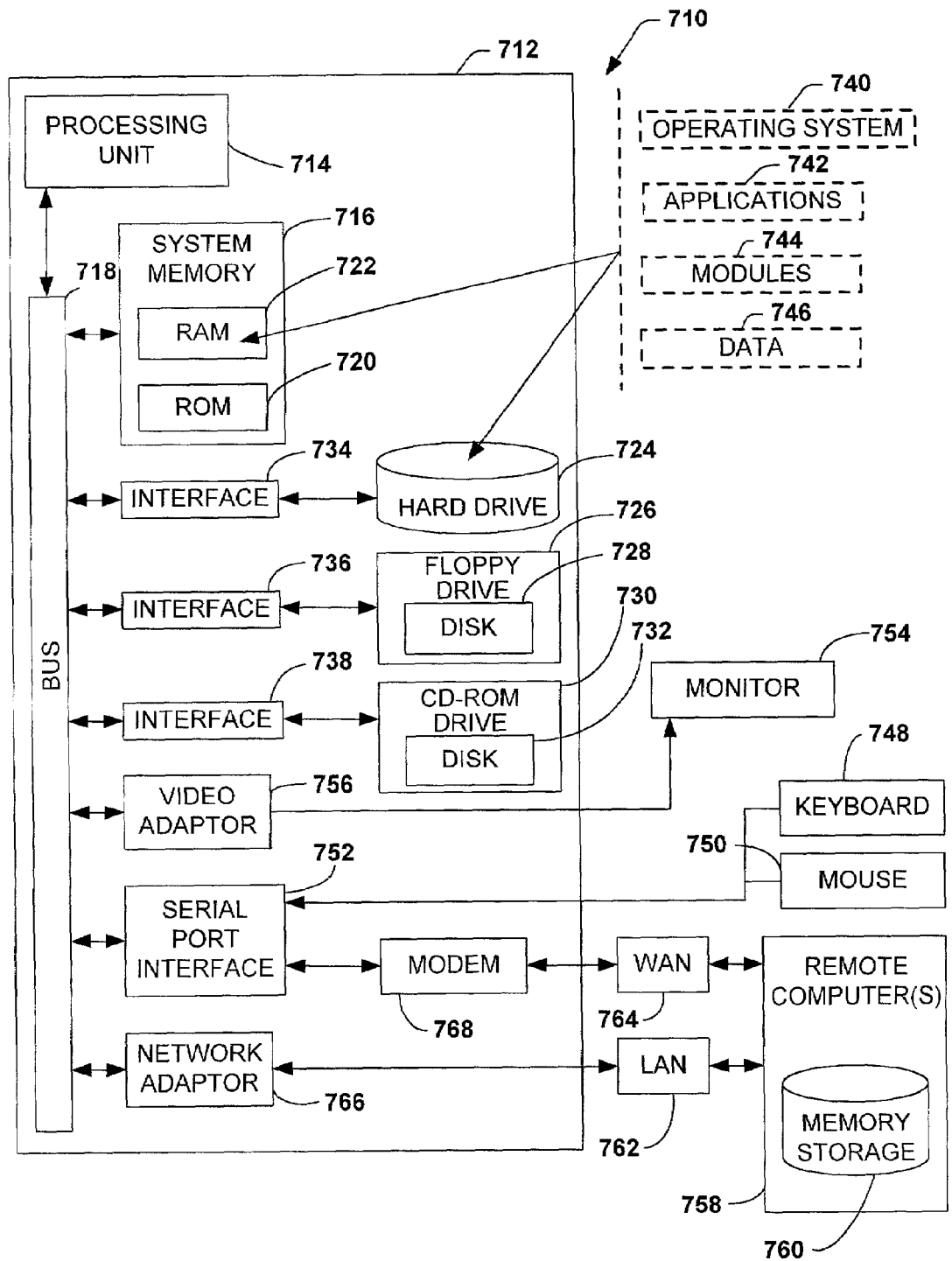
FIG. 10 is a schematic block diagram of an exemplary operating environment for a system configured in accordance with the present invention.

In order to provide additional context for various aspects of the present invention, FIG. 10 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules, and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 10, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors. Dual microprocessors and other multi-processor architectures also can be used as the processing unit 714.

The system bus 718 may be any of several types of bus structure including a memory bus or memory controller, a peripheral bus, and a local bus using any of a variety of conventional bus architectures such as PCI, VESA, Microchannel, ISA, and EISA, to name a few. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744 and program non-interrupt data 746. The operating system 740 in the illustrated computer is, for example, the "Microsoft® Windows® NT®" operating system, although it is to be appreciated that the present invention may be implemented with other operating systems or combinations of operating systems, such as UNIX®, LINUX®, etc.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WebTV® client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary, and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system to facilitate a remote user accessing an application across a stateless protocol, comprising the following computer executable components:
   a component for caching data associated with the remote user access, the data comprising state and user specific information; and
   a component for managing memory storing at least one of the state and user specific information, wherein the user specific information and the state information are stored in a user context object;
   a monitoring component that provides feedback information concerning usage of one or more user context objects; wherein more resources are allocated to a user context object when the feedback information indicates that the user context object has been utilized more than a first pre-determined threshold level; and
   the memory managing component reclaims resources allocated to the user context object upon a determination that the user context object has not been accessed within a pre-determined threshold period of time, the pre-determined threshold period of time can be dynamically changed based, at least in part, on feedback concerning usage of one or more user context objects.

2. The system of claim 1, the user specific information comprising at least one of:
   a record of views accessible to the remote user, a record of views recently displayed to the remote user, a record of folders recently accessed by the remote user, a record of URLs for folders commonly accessed by the remote user, a record of at least one of messages and folders moved or copied byte remote user, and email addresses for the remote user.

3. The system of claim 1, the state information comprising at least one of:
   a record of one or more entities involved in a process requiring multiple requests from the remote user via the stateless protocol.

4. The system of claim 3, the entities comprising at least one of:
   memory locations, folders, directories, messages, objects, processes, threads, records, files and data.

5. The system of claim 1, wherein the stateless protocol is HTTP.

6. The system of claim 1, the application comprising at least one of:
   email, chat sessions, database programs, video games, web-enabled applications and search engines.

7. The system of claim 1, wherein the user context object is assigned a globally unique identifier.

8. The system of claim 1, wherein the memory managing component manages one or more user context objects.

9. The system of claim 8, wherein the memory managing component can locate a user context object via an addressing algorithm, the algorithm employing the globally unique identifier, a locale identifier, a mailbox identifier and a security identifier.

10. The system of claim 1, wherein the resources include at least one of memory, data communications devices, processor time and network bandwidth.

11. The system of claim 1, wherein the pre-determined threshold period of time is one hour.

12. The system of claim 1, wherein the pre-determined threshold period of time can be dynamically increased based, at least in part, on feedback concerning increased usage of one or more user context objects.

13. The system of claim 1, the resources comprising at least one of memory, processor time, communication devices and network bandwidth.

14. The system of claim 1, wherein resources are reclaimed from a user context objects when the feedback information indicates that the user context object has been utilized less than a second pre-determined threshold level.

15. The system of claim 1, the resources comprising at least one of memory, processor time, communication devices and network bandwidth.

16. The system of claim 1, wherein resources are shifted between one or more user context objects based, at least in part, on feedback information.

17. The system of claim 1, further comprising a data packet transmitted between two or more computer processes, comprising;
   information related to facilitating remote access to an application, the access occurring across a stateless protocol, the information comprising:
   at least one of state and user specific information associated with the remote access of the application.

18. A computer implemented method for facilitating remote access to an application, the access occurring across a stateless protocol, comprising the following computer executable acts:
   allocating memory to cache at least one of state and user specific information associated with the remote access;
   caching the state information associated with the remote access of the application in the allocated memory;
   caching the user specific information associated with the remote access of the application in the allocated memory;
   monitoring feedback information concerning usage of memory allocated to cache at least one state and user specific information associated with the remote access; wherein additional memory is allocated to cache the at least one state and user specific information associated with the remote access when the feedback information indicates that the allocated memory has been utilized more than a pre-determined threshold level; and
   selectively reclaiming the memory allocated to cache the at least one of state and user specific information associated with the remote access, the reclaiming occurring upon the allocated memory not being accessed within a pre-determined period of time, the pre-determined period of time being dynamically changed based, at least in part, on feedback concerning the allocation of memory.

19. The method of claim 18, the pre-determined period of time being one hour.

20. The method of claim 18, the pre-determined period of time being dynamically adjustable based, at least in part, on feedback concerning the usage of the allocated memory associated with the remote access.

21. The method of claim 18, further comprising assigning a globally unique identifier to the memory allocated to cache the at least one of state and user specific information.

22. The method of claim 21, further comprising locating the at least one of state and user specific information via an algorithm, the algorithm employing the globally unique identifier, a locale identifier, a mailbox identifier and a security identifier.

23. The method of claim 18, the state information comprising at least one of:
   a record of one or more entities involved in a process requiring multiple requests from the remote user via the stateless protocol.

24. The method of claim 23, the entities comprising at least one of:
memory locations, folders, directories, messages, objects, processes, threads, records, files and data.

25. The method of claim 18, wherein the stateless protocol is HTTP.

26. The method of claim 18, the application comprising at least one of:
email, chat sessions, database programs, video games, web-enabled applications and search engines.

27. The method of claim 18, further comprising:
receiving feedback information concerning usage of one or more user context objects; and
allocating more resources to a user context object, based at least in part, on the feedback information.

28. The method of claim 27, further comprising:
de-allocating resources from a user context object based at least in part, on the feedback information.

29. The method of claim 27, further comprising:
shifting resources between one or more user context objects, based at least in part, on the feedback information.

30. A computer readable medium storing computer executable components of a system to facilitate a remote user accessing an application across a stateless protocol, the components including a component for caching data associated with the remote user access, the data comprising:
at least of one state and user specific information, the components including a component for selectively reclaiming the memory allocated to cache at least one state and user specific information associated with the remote access, the reclaiming occurring upon allocated memory not being accessed within a pre-determined period of time, the pre-determined period of time being dynamically changed based, at least in part, on feedback concerning the allocation of memory, the components including a monitoring component that provides feedback information concerning usage of memory allocated to cache the at least one state and user specific information associated with the remote access; wherein additional memory is allocated to cache the at least one state and user specific information associated with the remote access when the feedback information indicates that the allocated memory has been utilized more than a predetermined threshold level.

31. The computer readable medium of claim 30 further including a component for managing memory storing the at least one of state and user specific information.

32. A computer readable medium storing computer executable instructions operable to execute a method for facilitating remote access to an application, the access occurring across a stateless protocol, the method comprising the following computer executable acts:
allocating memory to cache at least one of state and user specific information associated with the remote access;
caching the state information associated with the remote access of the application in the allocated memory;
caching the user specific information associated with the remote access of the application in the allocated memory;
monitoring feedback information concerning usage of memory allocated to cache at least one state and user specific information associated with the remote access; wherein additional memory is allocated to cache the at least one state and user specific information associated with the remote access when the feedback information indicates
that the allocated memory has been utilized more than a pre-determined threshold level; and
selectively reclaiming the memory allocated to cache the at least one of state and user specific information associated with the remote access, the reclaiming occurring upon the allocated memory not being accessed within a pre-determined period of time, the pre-determined period of time being dynamically changed based, at least in part, on feedback concerning the allocation of memory.

33. The computer readable medium of claim 32, further including computer executable instructions operable to dynamically reallocate resources to or from one or more user context objects based, at least in part, on feedback information received from one or more monitoring components.

34. A computer executable system managing information in an application accessed via a stateless protocol, comprising:
computer implemented means for allocating memory to store at least one state and user specific information associated with a remote user access of an application, the application being accessed via a stateless protocol;
computer implemented means for caching, in the allocated memory, state information associated with the remote access of the application;
computer implemented means for caching, in the allocated memory, user specific information associated with a remote accessor of the application;
computer implemented means for locating the at least one state and user specific information cached in the allocated memory;
computer implemented means for monitoring feedback information concerning usage of memory allocated to cache at least one state and user specific information associated with the remote access; wherein additional memory is allocated to cache the at least one state and user specific information associated with the remote access when the feedback information indicates that the allocated memory has been utilized more than a pre-determined threshold level; and
computer implemented means for reclaiming the memory allocated when the memory has not been accessed within a pre-determined period of time, the predetermined period of time being dynamically changed based, at least in part, on feedback concerning the allocation of memory.

* * * * *